United States Patent Office 3,535,642
Patented Oct. 20, 1970

3,535,642
LINEAR THREE-TAP FEEDBACK SHIFT REGISTER
James E. Webb, Administrator of the National Aeronautics and Space Administration, with respect to an invention of Marvin Perlman, Granada Hills, Calif.
Filed Mar. 11, 1968, Ser. No. 712,065
Int. Cl. H03k *23/00*
U.S. Cl. 328—37          5 Claims

ABSTRACT OF THE DISCLOSURE

Two classes of feedback shift registers are disclosed. In the first class each FSR provides a near-maximal-length sequence $2^s-2$, while in the second class each FSR provides a near-maximal-length sequence $2^s-4$. The feature common to both classes is the use of a three-tap feedback logic from stages $i$, $j$ and $s$. For each value of $s$ in the first class the values of $i$ and $j$ are chosen as a function of a primitive polynomial of particular characteristics of an order $r=s-1$, while the values of $i$ and $j$ for each value of $s$ in the second class of FSR's is a function of a primitive polynomial of special characteristics of an order $r=s-2$.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to sequence generators and, more particularly, to a linear feedback shift register with three-tap feedback logic.

Description of the prior art

The theoretical analysis and the practical applications of maximal-length sequences or cycles, are well known. Typically, an $r$-stage linear feedback shift register (FSR) can be used to realize a sequence or cycle of $2^r-1$ states. Such a sequence is defined as a maximal-length sequence. The simplest feedback logic consists of a two-tap feedback arrangement, in which the modulo 2 sum of the outputs of two stages of the shift register is fed back to the first stage of the shift register.

Unfortunately, there are many values of $r$ for which maximal-length sequences cannot be realized with two-tap feedback logic. It has been established mathematically that maximal-length cycles cannot be realized with two-tap feedback logic when $r$ is 12, 13, 14, 19, 26, 27, 30, 34, 37, 38, 42, 43, 44 and 45. Other values of $r$ which fail to yield maximal-length sequences with two-tap feedback logic are a multiple of 8. In these cases, four or higher even number of taps must be used. This greatly increases the complexity of the feedback logic, which is a marked disadvantage.

Herebefore, maximal-length sequences have been employed in space exploration and interplanatory flights, mainly because of the unique autocorrelation function associated with such sequences. Basically, the autocorrelation function associated with a maximal-length sequence is two valued. In the in-phase condition it has a first value, while having a second value, which is distinguishable from the first, for any out-of-phase condition, irrespective of the out-of-phase value or magnitude. Though such a two-valued function is quite useful since its distinct in-phase value can be used to obtain sequence synchronization or sync, a function which has an additional distinct third value which is indicative of one out-of-phase condition, such as 180° out-of-phase would be more useful, since it would reduce sync acquisition time.

OBJECT AND SUMMARY OF THE INVENTION

It is a primary object of the present invention to provide a new feedback shift register.

Another object of the invention is the provision of a feedback shift register which is of simpler design than prior art feedback shift registers which require more than two-tap feedback logic to produce maximal-length sequences.

A further object of the invention is to provide a feedback shift register of relatively simple design to produce a sequence which is characterized by an autocorrelation function with more than two-levels, one of which represents a unique out-of-phase condition.

Still a further object of the invention is to provide a novel $n$-stage feedback shift register, where $n$ includes the integer values 8, 12, 13, 14, 16, 19, 26, 32, 37, 38, and 43, to produce a sequence of a length substantially equal to the sequence length achievable with a prior art $n$-stage feedback shift register, but one which requires simpler feedback logic.

These and other objects of the invention are achieved by providing an $s$-stage linear feedback shift register with a three-tap feedback logic which produce a sequence of a length $2^s-k$, where $k$ is either 2 or 4. Since $2^s-1$ is regarded a maximal-length sequence $2^s-2$ or $2^s-4$ are defined herein as near-maximal-length sequences, which are either 1 or 3 increments shorter than a maximal-length sequence, realizable with $s$ stages. With the teachings of the invention two classes of feedback shift registers may be realized. In the first class, each feedback shift register provides a near-maximal sequence $2^s-2$ for every value of $s$ equal to or less than 20 with the exception of 13, with only a three-tap feedback logic. The $s$ values include 12, 14, 16, 19, 26, 32, 38 and 43. These are values with which maximal-length sequences cannot be realized with less than four-tap feedback logic.

In the second class of feedback shift registers, near-maximal-length sequences of $2^s-4$ are produced with three-tap feedback logic, for nearly all values of $s$ equal to or less than 21 including 12, 13, 16, 19 and 37 with which maximal-length sequences cannot be realized with less than four-tap feedback logic. The autocorrelation function of any near-maximal-length sequence is more than two valued. One value is distinct to the in-phase condition while a different value is distinct to a 180° out-of-phase condition. Thus, advantages in addition to those characteristic of the autocorrelation function of a maximal-length sequence are realized when employing a near-maximal-length sequence.

The novel features of the invention are set forth with particularity in the appended claims. The invention will best be understood from the following description when read in conjunction with the accompanying drawings.

Oct. 20, 1970

Figure 1:
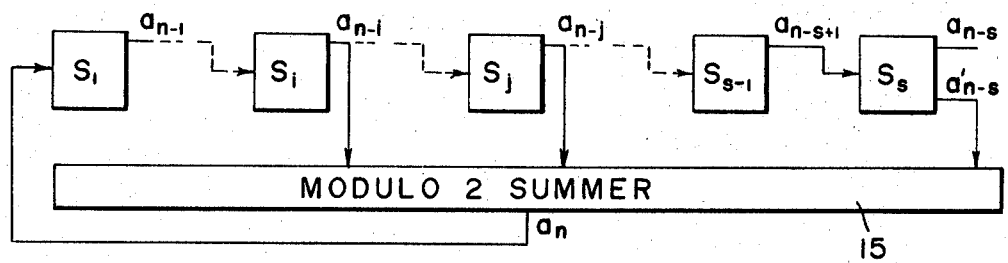
FIG. 1 is a generalized block diagram, characteristic of any linear feedback shift register in accordance with the present invention.

JAMES E. WEBB
ADMINISTRATOR OF THE NATIONAL AERONAUTICS
AND SPACE ADMINISTRATION
LINEAR THREE-TAP FEEDBACK SHIFT REGISTER
Filed March 11, 1968

3,535,642

INVENTOR.
MARVIN PERLMAN

BY

ATTORNEYS

In this class of FSR's the values of $i$ and $j$, for each value of $s$, are also selected as a function of a primitive polynomial of an order $r$, lower than $s$.

The characteristic polynomial $$\theta(\lambda)=(\lambda+1)^3 g(\lambda)$$

where $g(\lambda)$ is of degree $r$ and maximal is the characteristic polynomial of an $(r+3)$-stage linear FSR with a major cycle length of $$4(2^r-1) \text{ or } 2^{r+2}-4$$

A major cycle length of $2^{r+2}-4$ can be realized with an $(r+2)$-stage linear FSR. By complementing the feedback, a factor of $\lambda+1$ is introduced. Thus, $$\phi(\lambda)^* = (\lambda+1)^2 g(\lambda) = (\lambda^2+1) g(\lambda)$$

characterizes a linear FSR with a major cycle length of $2^{r^2}-4$. For $\phi(\lambda)^*$ to result in a tetranomial, $g(\lambda)$ has to be selected such that the binary sequence of coefficients either starts with a run of ones and ends with alternating zeros and ones (i.e., 1 1 0 1 . . . 0 1), or starts and ends with alternating subsequences separated by a run of zeros or ones. A $g(\lambda)$ of the first form yields a feedback configuration in which $i$ is always equal to 1.

For example, to generate a sequence of length $2^{10}-4$, the values of $i$ and $j$ are determined by selecting a primitive polynomial $g(\lambda)$ of order eight ($r=10-2=8$), such as $$g(\lambda)=\lambda^8+\lambda^7+\lambda^6+\lambda^5+\lambda^4+\lambda^3+\lambda^2+\lambda^1$$

Thus, $$\phi(\lambda)^*=(\lambda^2+1)g(\lambda)=g(\lambda)+\lambda^2 g(\lambda)=\lambda^{10}+\lambda^9+\lambda^5+1$$

or $$\alpha_n = 1 + \alpha_{n-1} + \alpha_{n-5} + \alpha'_{n-10}$$

Thus, $i$ and $j$ have values of 1 and 5, respectively. These values are shown in Table II for $s=10$.

In this example, $\phi(\lambda)^*$ can be determined from the modulo 2 sum of $\lambda^2 g(\lambda)$ and $g(\lambda)$ as follows:

```
      111110101           λ²g(λ)
      111110101            g(λ)
    11000100001          (λ²+1)g(λ)
   λ10 + λ9 + λ5 + 1
    aₙ = aₙ₋₁ + aₙ₋₅ + aₙ₋₁₀
```

The degree of the highest degree term represents the number of stages (10) The other one coefficients in the first and 10th positions indicate the stages to be fed back.

From Tables I and II it should be apparent that in accordance with the teachings disclosed herein at least one near-maximal-length sequence can be generated with only three-tap ($i$, $j$ and $s$) feedback logic, for every value of $s$ from 4 through 21 and other values These other values represent values with which maximal-length sequences cannot be realized with two-tap feedback logic. Thus, the FSR of the present invention can be advantageously employed for many cases where a maximal-length sequence, $2^s-1$, cannot be realized with two-tap feedback logic. As previously indicated, this includes the situations in which $s=8, 12, 13, 14, 16, 19, 26, 32, 37, 38$ and 43. However due to the unique autocorrelation characteristics of a near-maximal-length sequence as defined herein, the FSR of the present invention may be used even with values of $s$ with which maximal-length sequences are realizable with two-tap feedback.

In order to appreciate the reason why one would use an FSR of the present invention requiring three-tap feedback logic, when a maximal-length sequence is realizable with two-tap feedback logic it is necessary to compare the autocorrelation characteristics of the two sequences. This may best be achieved with a specific example in which the autocorrelation function of a maximal-length sequence $2^4-1=15$, realizable with a prior art FSR will be compared with the function of a near-maximal-length sequence $2^4-2=14$, produced by a four-stage FSR constructed in accordance with the teachings, hereinbefore disclosed.

As is appreciated by those familiar with the art of generating binary sequences, given a maximal-length sequence, generated with four stages, with an initial 0000 state and a linear recurrence relationship of $$a_n = a'_{n-1} + a_{n-4}$$

a periodic sequence will result, such as $$\{a_n\} - - - - 0000101001101111 - - - -$$

The autocorrelation of $\{a_n\}$ and $\{a_{n-\tau}\}$ where $\{a_n\}$ is delayed $\tau$ clock time intervals is defined as:

$$C[\{a_n\}, \{a_{n-\tau}\}] = C(\tau) = A - D$$

where A is the number of agreements per period, and D is the number of disagreements per period. The comparison is made on a bit-by-bit basis.

As is appreciated, when $\tau=0$ $C=15$ and when $$1 \leq \tau \leq 14$$

Figure 2:
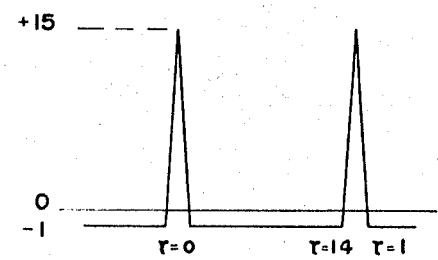
FIGS. 2 and 3 are diagrams of autocorrelation functions of $2^s-1$ and $2^s-2$ sequences.

$C=-1$. These values are diagrammed in FIG. 2 which is a typical diagram of the autocorrelation function of a maximal-length sequence. From it, it is apparent that the function is two-valued. The in-phase condition value which is $+15$ is readily distinguished from the $-1$ value which is for the out-of-phase condition ($\tau \neq 0$).

The autocorrelation function of a near-maximal-length sequence $2^4-2=14$ may be derived by first determining the periodic sequence of such a 14 bit sequence. Given a near-maximal-length four-stage FSR with a linear recurrence relationship $$a_n = a_{n-1} + a_{n-2} + a'_{n-4}$$

the periodic sequence is 00001001111011. $C(\tau)$ for all $\tau$ is summarized as follows:

| $\tau$ | $C(\tau)$ | $\tau$ | $C(\tau)$ |
|---|---|---|---|
| 0 | 14 | 7 | −14 |
| 1 | 2 | 8 | −2 |
| 2 | −2 | 9 | 2 |
| 3 | 2 | 10 | −2 |
| 4 | −2 | 11 | 2 |
| 5 | 2 | 12 | −2 |
| 6 | −2 | 13 | 2 |

Figure 3:
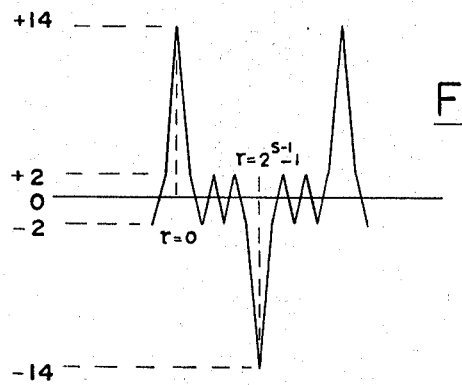

These relationships are represented in the graph shown in FIG. 3. In general $C(\tau) = \pm(2^s-2) \pm 2$. Thus, the function is four-valued. The in-phase condition is associated with $+(2^s-2)$ and the 180°-out-of-phase condition ($\tau=2^{s-1}-1$) is associated with $-(2^s-2)$. All other out-of-phase conditions are associated with values $\pm 2$, which are small compared to the in-phase and 180°-out-of-phase conditions.

Likewise, the autocorrelation function of the near-maximal-length sequence $2^s-4$ has more than two values. Indeed, it is five-valued.

$$C(\tau) = \pm(2^{s-4}), 0, \text{ or } \pm 4$$

The in-phase condition is associated with $+(2^{s-4})$ and the 180°-out-of-phase condition is associated with $$-(2^{s-4})$$

All other out-of-phase conditions are associated with $+4$, $-4$, or 0.

It is thus seen that either near-maximal-length sequence has a correlation function in which both the in-phase and the 180°-out-of-phase conditions are readily distinguishable from all other out-of-phase conditions. This is a most useful property when such a sequence is used in ranging since meaningful information, related to a received sequence and a locally generated sequence, may be obtained when the two are 180°-out-of-phase. Indeed, with such sequences, sync acquisition time may be greatly reduced. Thus, the teachings of the present invention may find applications with various values of $s$ with which maximal-length sequences are realizable with two-tap feedback logic.

The actual implementation of the feedback logic unit 15 depends on the particular type of the stages of the FSR. It can be stated however, that the complexity of unit 15 is reduced whenever $i=1$. This is particularly true when reset-set (RS) type flip-flops are used. To highlight this point, reference is made to FIG. 4 which is a block diagram of an eight-stage FSR, designed to produce a near-maximal length sequence, $2^8-2$. Each stage ($s=1, 2 \ldots 8$) is a RS flipflop zero (0) enabled, consisting of a bistable element and two gates which drive the element to one or the other state, only in synchronism with the clock pulse. Each stage has an assertion output and a negation output which are supplied to the R and S inputs respectively, of a succeeding stage.

Figure 4:
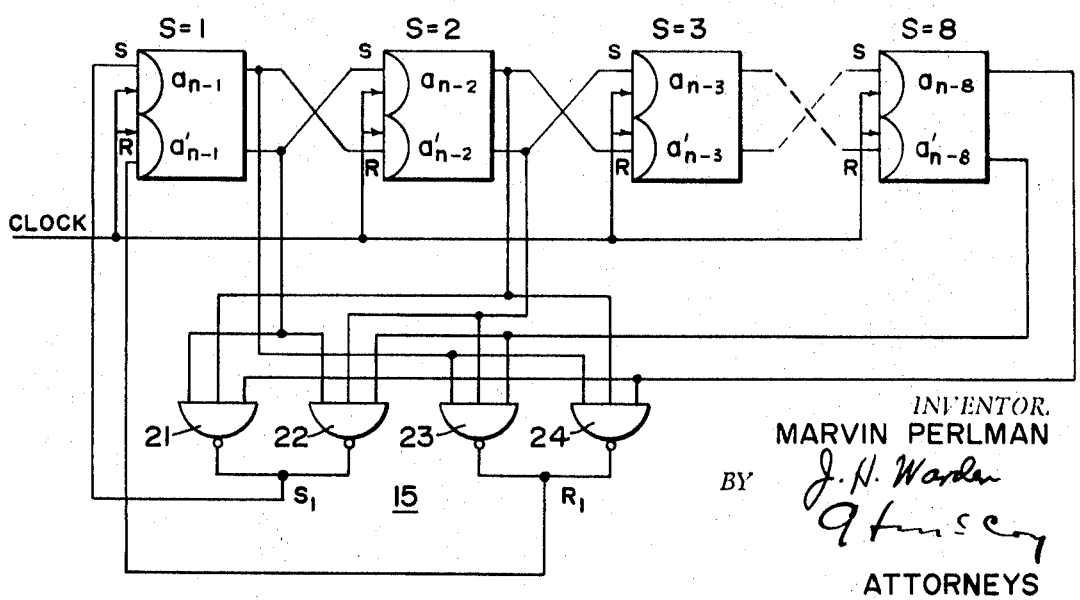
FIG. 4 is a block diagram of an 8-stage feedback shift register connected to provide a $2^s-2$ sequence.

As seen from Table I for $s=i$, $i=1$ and $j=2$. Thus, the three stages whose outputs are combined in the logic unit 15 are the first ($s=1$), the second ($s=2$) and the last ($s=8$) stages. In FIG. 4 unit 15 is shown consisting of four NAND gates 21–24. The outputs of 21 and 22 are connected together, and supplied to the S input of the first stage, while the connected outputs of 23 and 24 are supplied to the R input of the first stage.

The three inputs to each of the four gates may be expressed in general terms as follows:

| Gate 21 | $\begin{cases} a'_{n-i} \\ a_{n-j} \\ a_{n-s} \end{cases}$ | Gate 22 | $\begin{cases} a_{n-i} \\ a'_{n-j} \\ a'_{n-s} \end{cases}$ |
|---|---|---|---|
| Gate 22 | $\begin{cases} a'_{n-i} \\ a'_{n-j} \\ a'_{n-s} \end{cases}$ | Gate 24 | $\begin{cases} a_{n-i} \\ a_{n-j} \\ a_{n-s} \end{cases}$ |

In the particular example $i=1$, $j=2$ and $s=8$.

Figure 5:
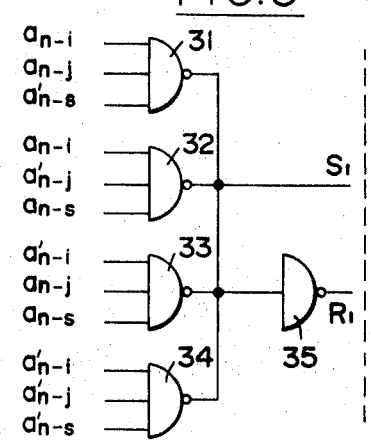
FIG. 5 is a diagram of the three-tap feedback logic which is required when $i \neq 1$.

The four-gate feedback logic is applicable for all FSR's in which $i=1$. A five-gate feedback arrangement such as the one shown in FIG. 5 is required whenever $1<i<j<s$. In FIG. 5 the five gates are designated by numerals 31–35.

Summarizing the foregoing description, in accordance with the teachings of the present invention two classes of FSR's are provided. The feature common to both classes is the three-tap feedback logic, employed in each FSR. In the first class, each FSR provides a near-maximal-length sequence of $2^s-2$ increments, while in the second class the FSR provides a sequence of $2^s-4$ increments. The values of $s$ include many values with with two-tap feedback logic cannot be used to produce maximal-length sequences. The autocorrelation function of an FSR in either clas is more than two-valued. It includes a distinct value of the 180°-out-of-phase condition, a characteristic most useful in ranging and sync acquisition.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A sequence generator for providing a near-maximal-length numerical sequence of $2^s-k$ terms, with $s$ stages, with $k$ being equal to 2 or 4, the generator comprising:
   $s$ elements arranged in a sequence from 1 to $s$; and
   feedback means responsive to the negation output of the last $s^{th}$ element in said sequence and at least to the assertion outputs of the $i^{th}$ and $j^{th}$ elements in said sequence and connected to the first element in said sequence to supply it with an input which is a function of the modulo 2 summation of the outputs of said elements supplied thereto, wherein the $j^{th}$ element is any element in said sequence except the first or last element, and the $i^{th}$ element is any element in the sequence except the last element and the one preceding the last element.

2. The generator as recited in claim 1 wherein $k=2$ and $s=r+1$, where $r$ represents a number of elements with which a maximal-length sequence of $2^r-1$ terms is realizable, and $i$ and $j$ are determinable as a function of the primitive polynominal of such a realizable maximal-length sequence.

3. The generator as recited in claim 1 wherein $k=4$ and $s=r+2$ where $r$ represents a number of elements with which a maximal-length sequence of $2^r-1$ terms is realizable and $i$ and $j$ are determinable as a function of the primitive polynomial of such a realizable maximal-length sequence.

4. A sequence generator comprising:
   $s$ bistable elements arranged in a sequence from 1 to $s$; and
   feedback means responsive to the false output of the last, $s^{th}$ element and the true outputs of at least the $i^{th}$, and the $j^{th}$ elements and connected to the first element in said sequence to provide a near-maximal-length major cycle of $2^s-2$, for various values of $s$, at least the $i^{th}$ and $j^{th}$ elements are selected as a function of a primitive polynomial of degree $r$, where $r=s-1$ with which a maximal-length sequence $2^r-1$ is realizable with two-tap logic, wherein the $j^{th}$ element is any element in said sequence except the first or last element, and the $i^{th}$ element is any element in the sequence except the last element and the one preceding the last element.

5. A sequence generator comprising:
   $s$ bistable elements arranged in a sequence from 1 to $s$; and
   feedback means responsive to the outputs of $i^{th}$, $j^{th}$ and $s^{th}$ elements and connected to the first element in said sequence to provide a near-maximal-length major cycle of $2^s-4$, for various values of $s$, $i$, and $j$ are selected as a function of a primitive polynomial of degree $r$, where $r=s-2$ with which a maximal-length sequence $2^r-1$ is realizable with two-tap logic wherein the $j^{th}$ element is any element in said sequence except the first or last element, and the $i^{th}$ element is any element in the sequence except the last element and the one preceding the last element.

References Cited

UNITED STATES PATENTS 3,069,657  12/1962  Green _____ 307—221
3,258,696   6/1966  Heymann _____ 307—221

DONALD D. FORRER, Primary Examiner

J. D. FREW, Assistant Examiner

U.S. Cl. X.R.

307—220, 221, 223; 328—42, 43